Dec. 8, 1964 L. N. ALBRECHT 3,160,292
SHOPPING CART STACKER

Filed Jan. 15, 1962 7 Sheets-Sheet 1

INVENTOR.
LEONARD N. ALBRECHT
BY *Lothrop & West*

ATTORNEYS

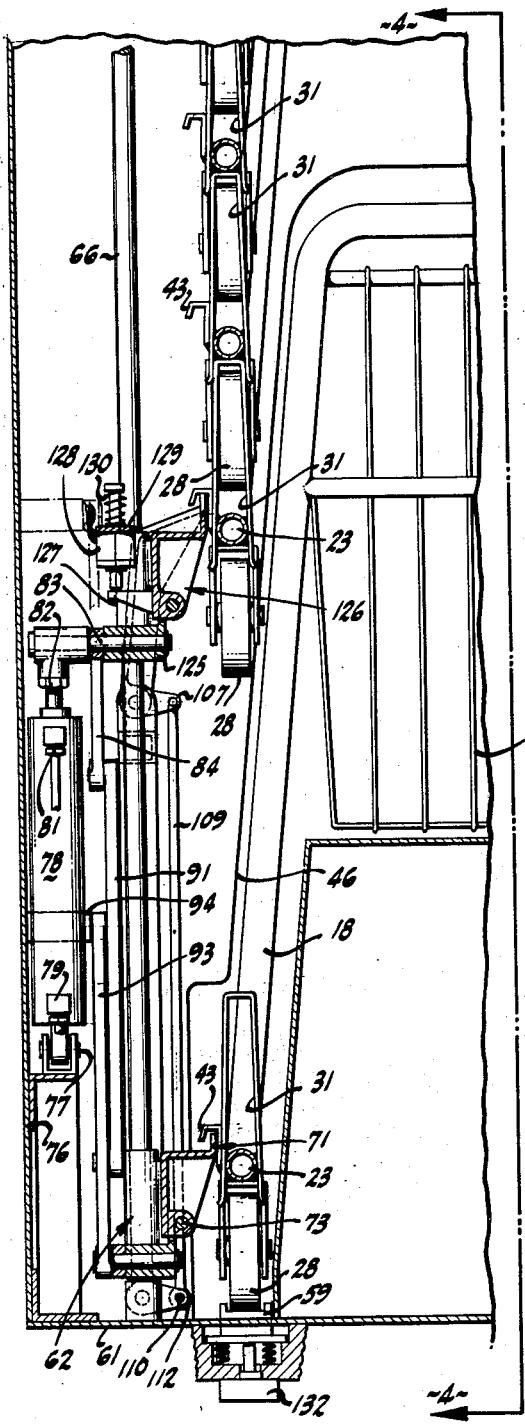
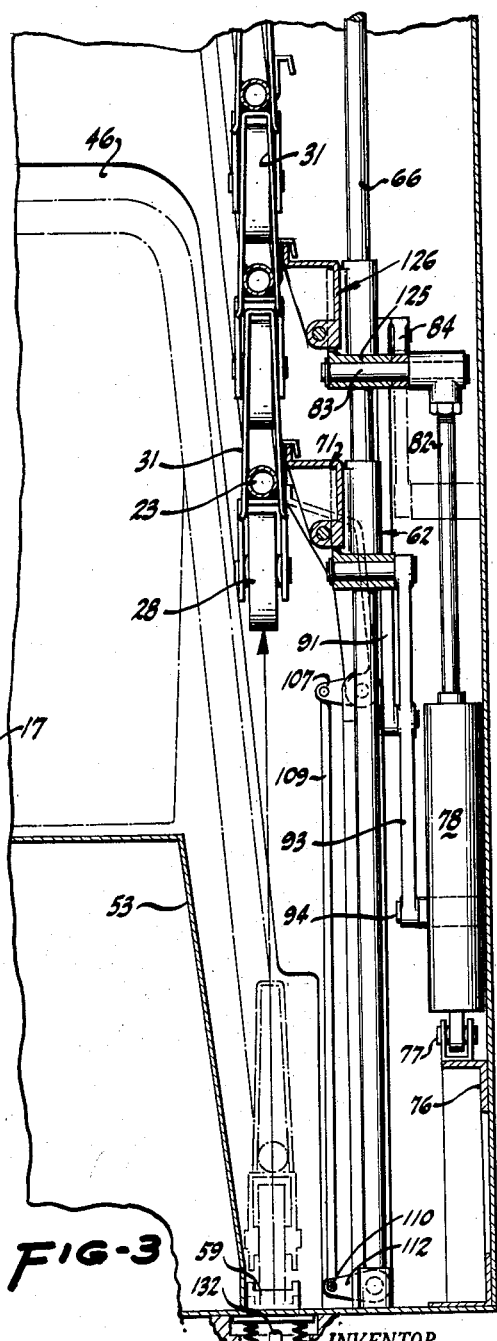
FIG-2
FIG-3
INVENTOR.
LEONARD N. ALBRECHT
BY Lothrop & West
ATTORNEYS

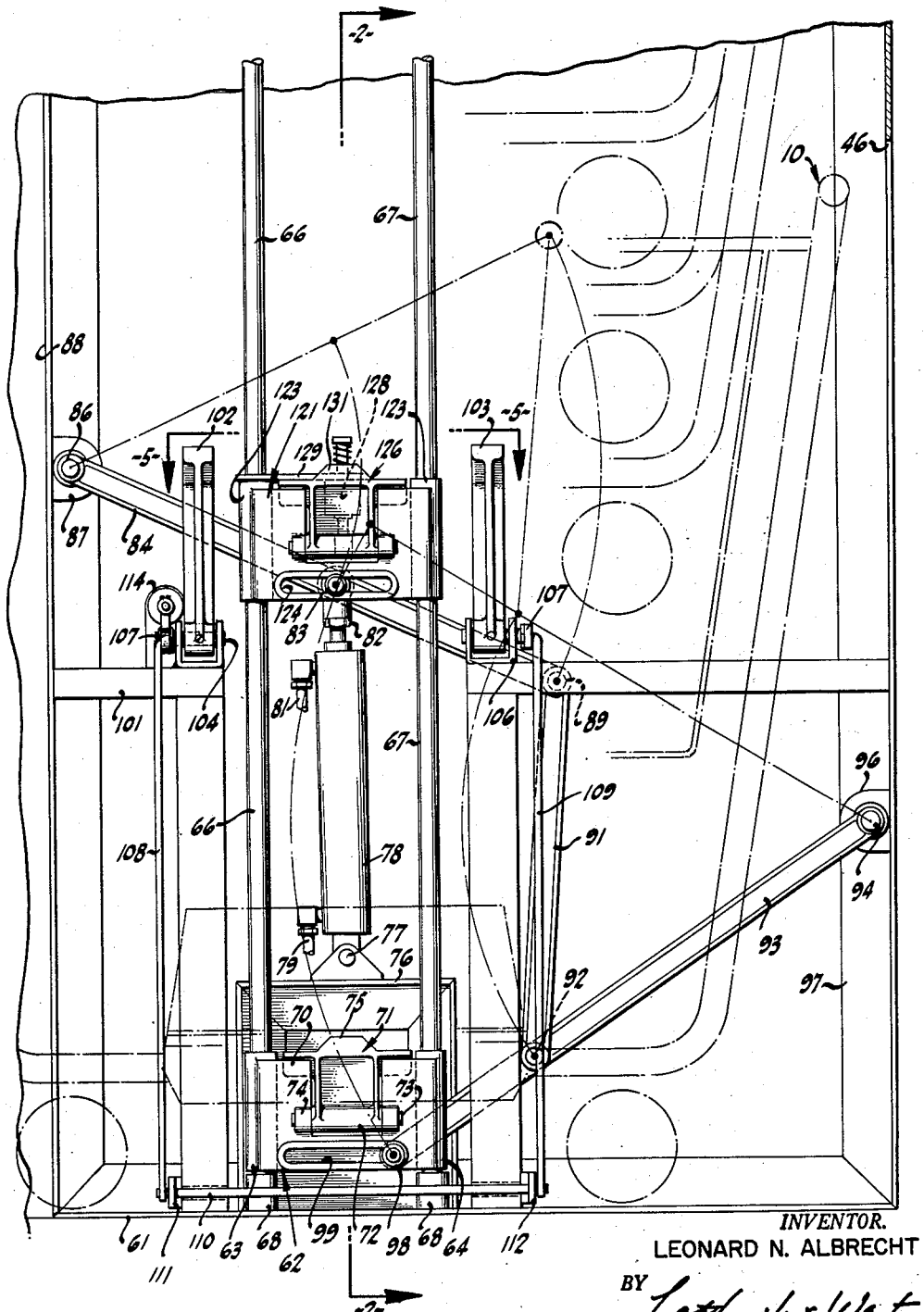

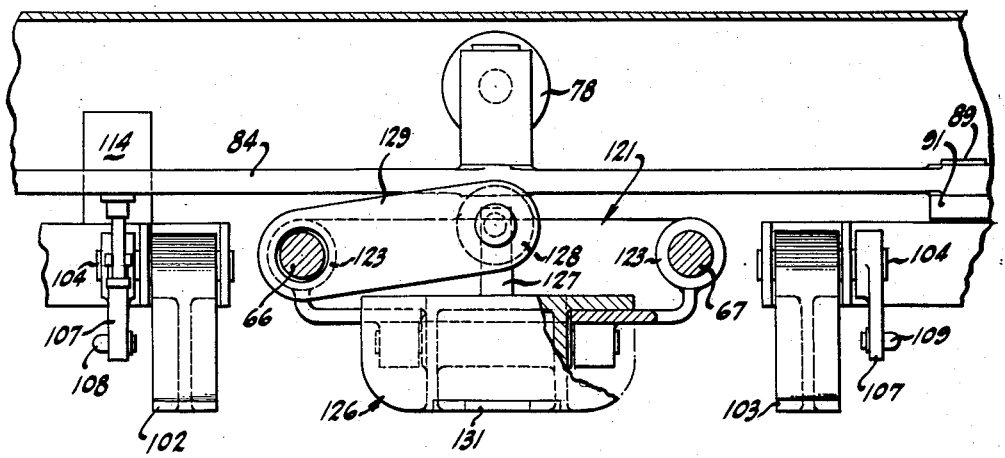
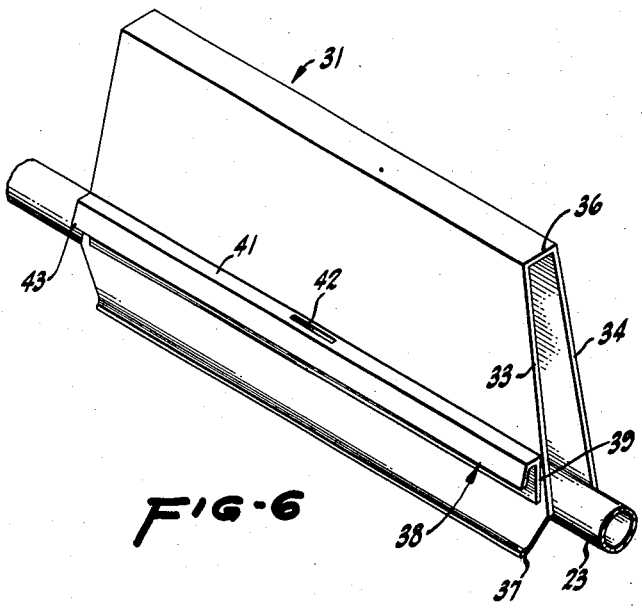

Dec. 8, 1964
L. N. ALBRECHT
3,160,292
SHOPPING CART STACKER
Filed Jan. 15, 1962
7 Sheets-Sheet 5
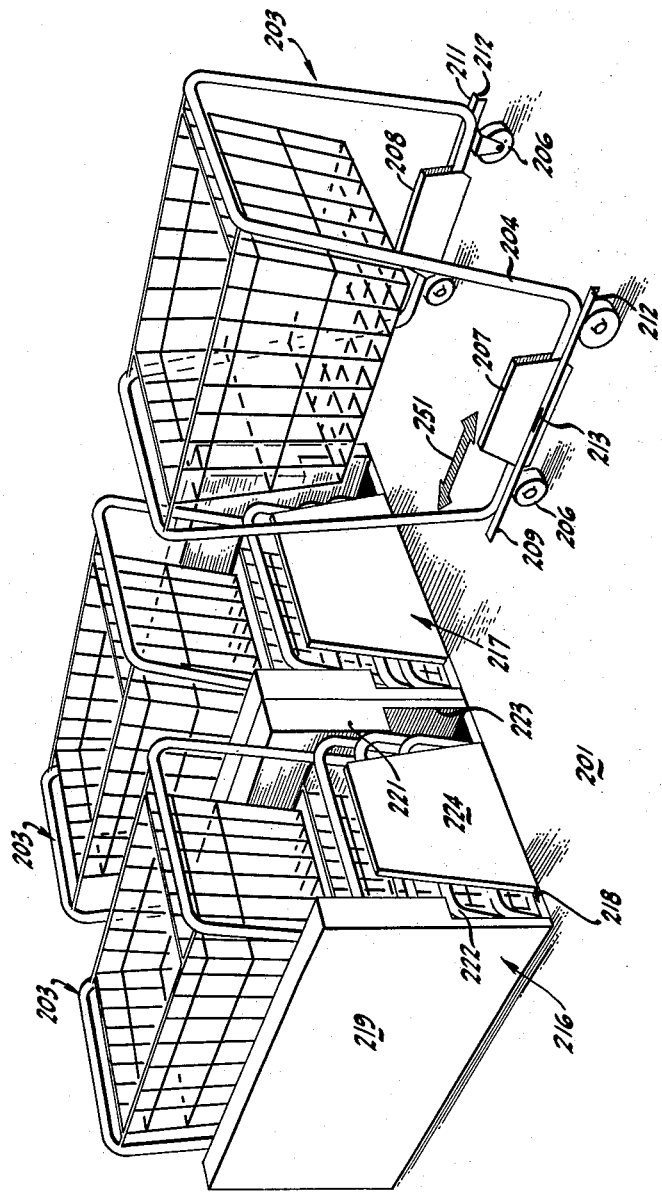
INVENTOR.
LEONARD N. ALBRECHT
BY *Lothrop & West*
ATTORNEYS

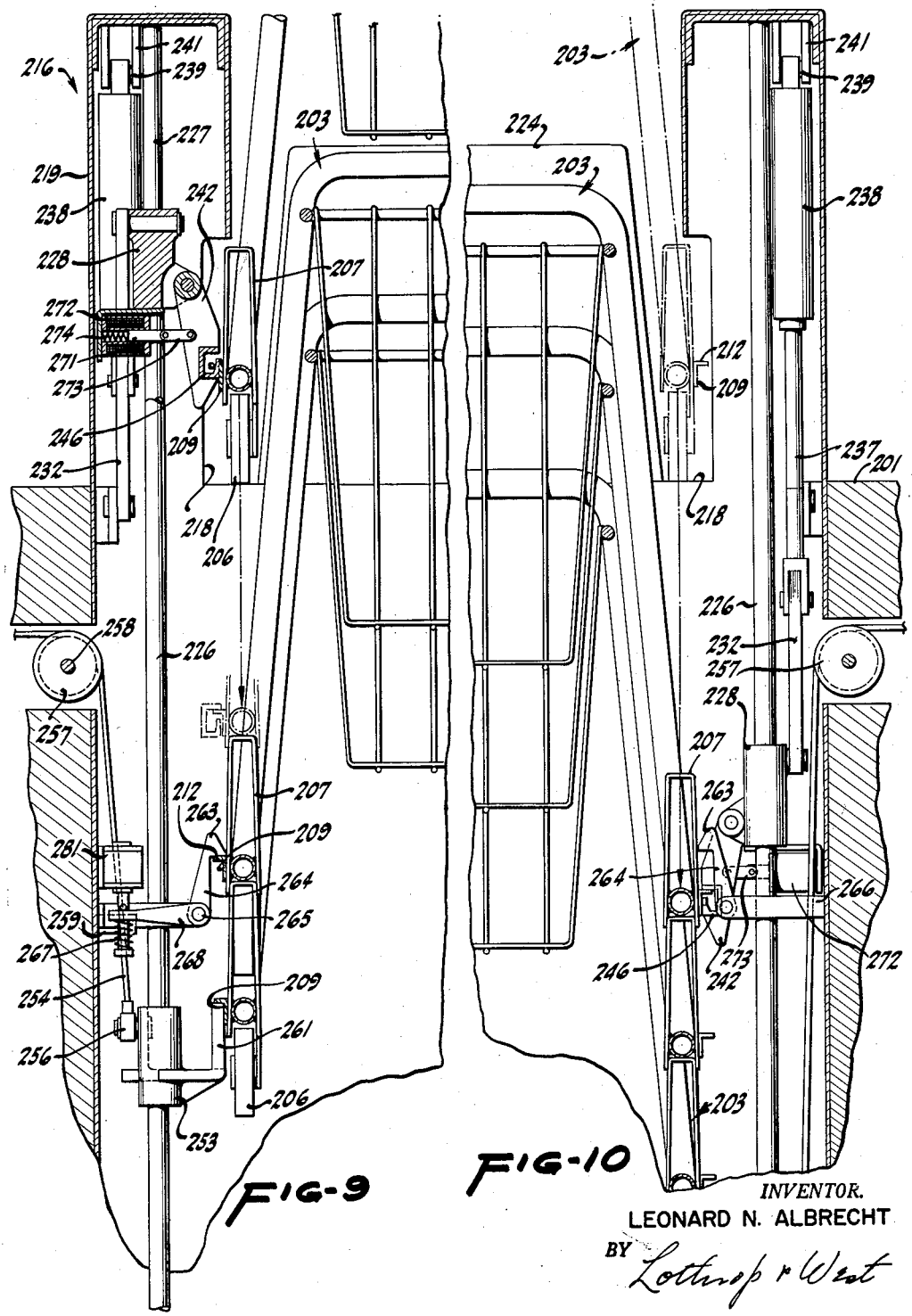

3,160,292
SHOPPING CART STACKER
Leonard N. Albrecht, 30 Excelsior Lane, Sausalito, Calif.
Filed Jan. 15, 1962, Ser. No. 166,097
10 Claims. (Cl. 214—6)

My invention relates to a device especially useful in large markets or stores in which the patrons normally employ shopping carts. The device is for the purpose of stowing or storing the shopping carts in a compact array readily available to dispense an empty shopping cart to a patron and equally available to receive a no longer required shopping cart from a patron.

At the present time, particularly in supermarkets and shopping centers, shopping carts are employed to hold various goods being purchased for ready conveyance and such shopping carts normally comprise a frame of some character available to be moved about on wheels by the shopper from place to place. The frame supports a basket of an appropriate design to receive the commodities being purchased. In many instances the shopping carts when unused are parked in a store area available to the incoming patrons and also available to the patrons checking out. Shopping carts, although often made in a fashion to nest in a horizontal direction, nevertheless occupy a large amount of the store floor space and also often get in the way of the traffic flow into the store and out of the store. They are also sometimes susceptible to various nuisances. For example, packages or products left in them can be played with by children and sometimes the carts are so disposed that they might cause injury to a customer or customer's child.

It is therefore an object of my invention to provide a shopping cart stacker which will store or park unused shopping carts in substantially less floor area than now is required.

Another object of the invention is to provide a shopping cart which can be arranged in a vertically nested array.

Another object of the invention is to provide a shopping cart stacker which will disepnse a single shopping cart at a time to a patron.

Another object of the invention is to provide a shopping cart stacker which will receive an emptied cart individually and stack it in appropriate position automatically.

Another object of the invention is to provide a shopping cart stacker which will accommodate itself to the demand for shopping carts and for the reception of unused shopping carts.

A still further object of the invention is to provide a shopping cart stacker which will be quite safe for the patron to use and will be quite safe for small children who may be in the area.

Another object of the invention is to provide a shopping cart stacker that operates semiautomatically; that is, without the necessity of supervision by a store employee.

Another object of the invention is to provide a shopping cart stacker which can be so disposed as not substantially to interfere with the incoming shopper traffic or the outgoing purchaser traffic.

Another object of the invention is in general to improve the handling of shopping carts in shopping centers.

Other objects of the invention together with the foregoing are attained in the embodiments of the invention described in the accompanying description and illustrated in the accompanying drawings in which:

FIGURE 2 is a cross section on a vertical transverse plane through one side of a shopping cart stacker pursuant to the invention showing a part of a cart in position for further handling and showing the lower elevator in a lower position, parts thereof being in cross section;

FIGURE 3 is a view complementary to FIGURE 2, the cross section being through the other side of the stacker, and showing similar parts to those in FIGURE 2 but with a cart in an elevated stacked location and the parts correspondingly positioned, the plane of section of FIGURES 2 and 3 being indicated by the line 2—2 of FIGURE 4;

FIGURE 4 is a side elevation with various parts removed and broken away, the view being taken on the line 4—4 of FIGURE 2;

FIGURE 5 is a cross section in detail, the plane of the section being indicated by the line 5—5 of FIGURE 4;

FIGURE 6 is an isometric view showing in detail a part of the stacking and positioning mechanism included in a shopping cart;

FIGURE 7 is a perspective view of a modified form of apparatus showing a number of shopping carts in position with an additional cart in location to be handled by the appropriate portion of the apparatus;

FIGURE 9 is a cross section through one side of the mechanism showing the structure for lowering and raising the carts below floor level; and FIGURE 10 is a view similar to FIGURE 9 but showing the other side of the structure in a different portion of its operating cycle.

Figure 1:
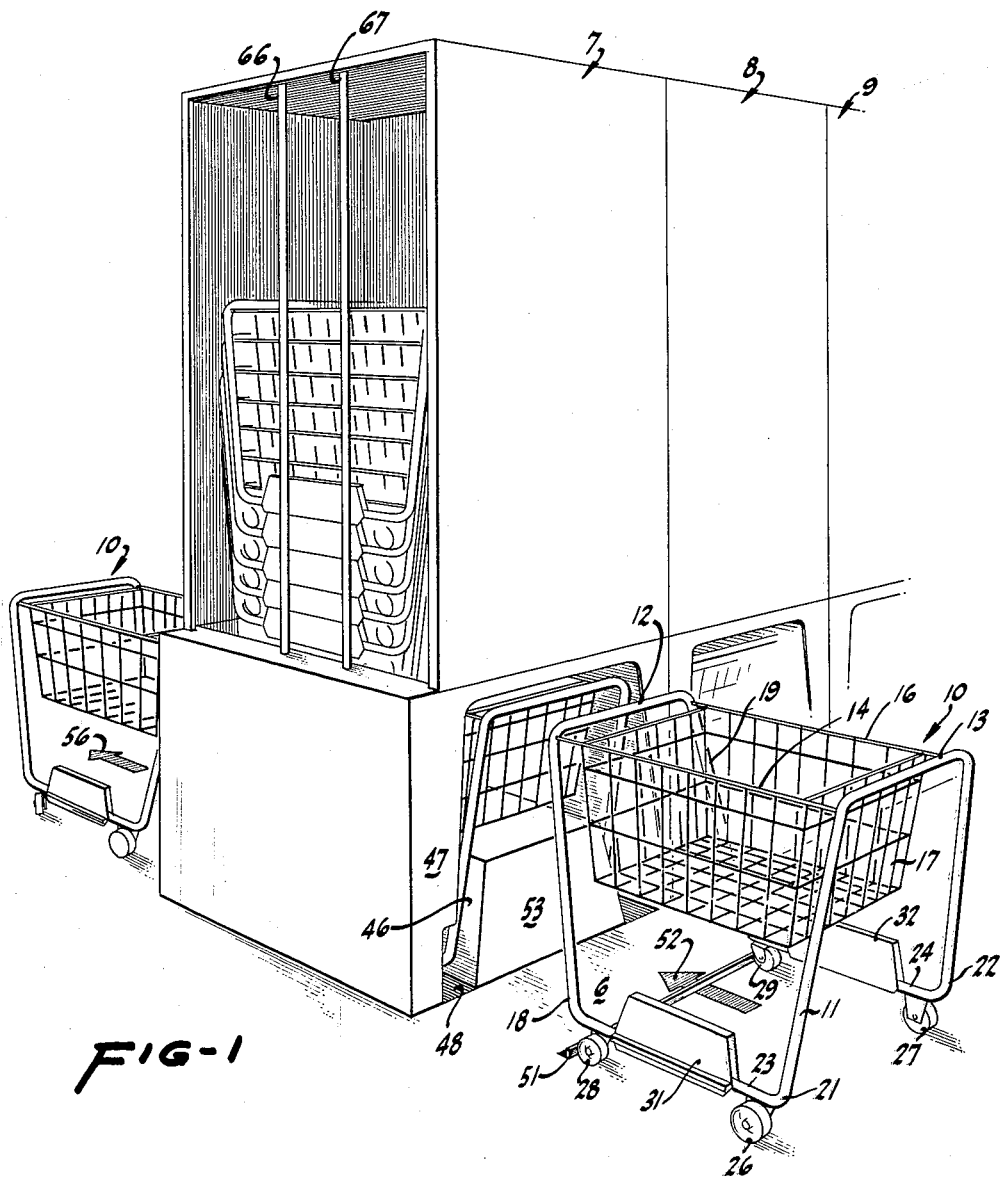
FIGURE 1 is a perspective view, parts being broken away to reduce the size of the figure, of a number of shopping cart stackers constructed in accordance with my invention showing a shopping cart in position to be taken from the machine and another shopping cart in a position to be released to the machine.
Figure 8:
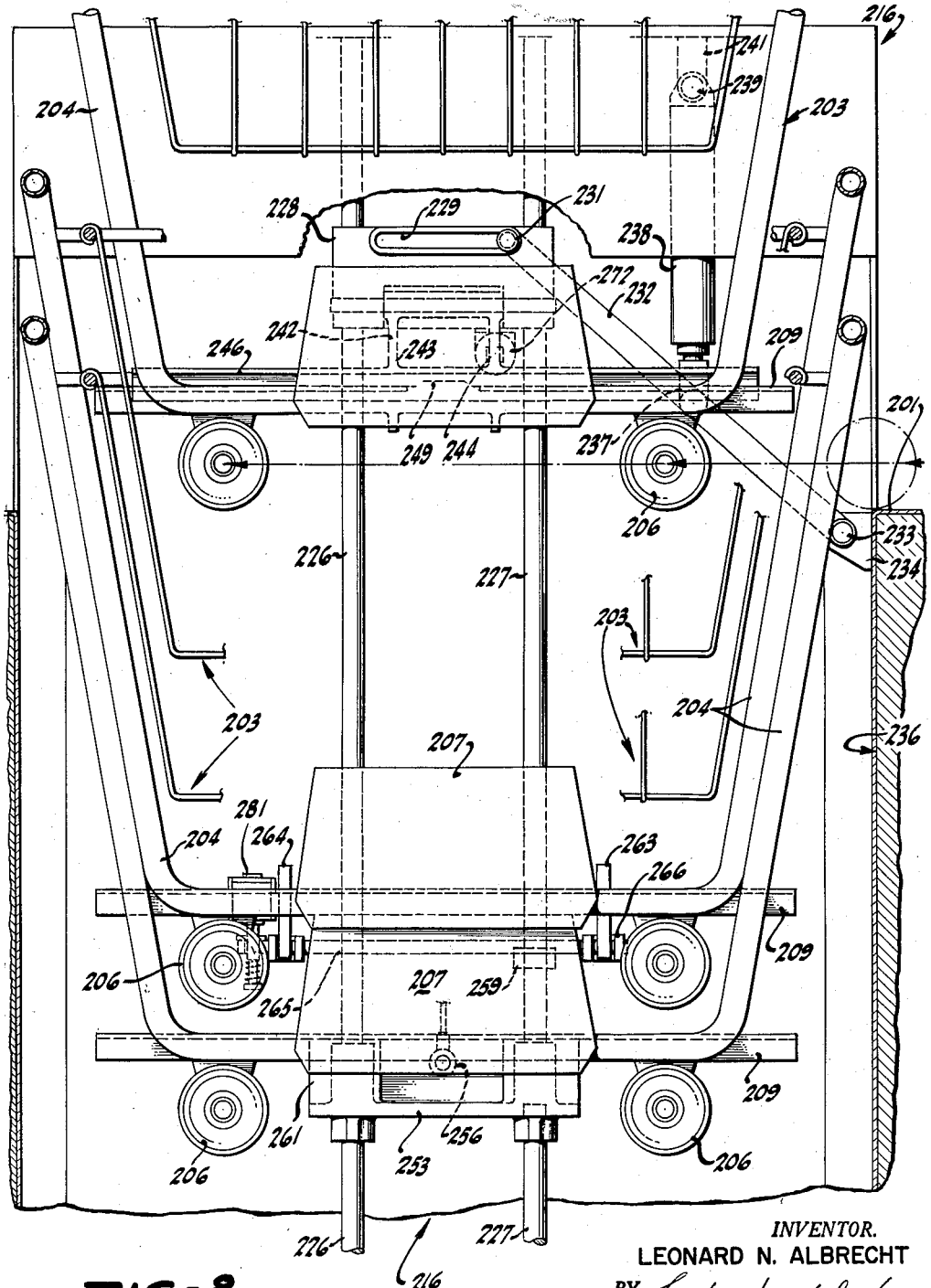
FIGURE 8 is a side elevation of a portion of the apparatus, certain parts being broken away and indicating the mechanism for lowering the carts from a position substantially even with the floor to a lower location and for lifting the carts from the lower position back to floor level.

While the shopping cart stacker pursuant to the invention can be embodied in a number of different ways and is herein illustrated and described as adapted for stacking above the floor of an establishment and also as adapted for stacking below the floor of the establishment, it is first considered in its form for stacking above the floor. In this instance, the mechanism can be readily portable and can be utilized in any convenient location within a marketing area without affecting the construction of the building in which the device is utilized.

In this instance, as shown in FIGURES 1–6 inclusive, the mechanism is located within a marketing area having a floor 6. The shopping cart stacker conveniently is fabricated in a number of individual units 7, 8, 9 and the like, all of which are substantially identical and are conveniently lined up in a battery on the floor 6.

Especially designed for utilization with the stacker is a particular form of shopping cart 10. This conveniently includes a tubular frame 11 convoluted to provide convenient cross bars 12 and 13 in a location for ready grasping by the user and carrying a pair of side bars 14 and 16 suspending a carrying basket 17 therefrom. The frame 11 is also convoluted to provide inclined support sections 18 and 19 at one end and support sections 21 and 22 at the other end, these being not only inclined from the side view, but also being inclined from the end view so that successive frames 11 can be vertically stacked with respect to each other in nested relationship. The members 18 and 19 and the members 21 and 22 merge in horizontal rails 23 and 24 forming a continuous tubular framework.

To support the framework and the basket 17 there are provided ground-engaging wheels 26 and 27 at one end and 28 and 29 at the other end. If desired, some of these wheels may be caster wheels. In addition to the frame 11, the cart includes a pair of support frames 31 and 32 (FIGURE 6) conveniently fabricated of a folded sheet of metal providing a pair of substantially upright but inclined side walls 33 and 34 merging in a substantially planar top wall 36 parallel to the bar 23. The walls 33 and 34 are inclined outwardly and downwardly and not only depend below the associated frame bar 23, but diverge sharply therefrom at their lower margins 37.

In addition, the support frame 31 is provided along one side slightly above the elevation of the bar 23 with a hook channel 38 having a base 39 secured preferably by welding to the wall 33 and also having a flat top strap 41. Between its ends the strap 41 is perforated by a key slot 42 of generally rectangular configuration. An outer depending flange 43 completes the hook channel 38. The support frame 32 is just like the support frame 31 but is reversed so as to be symmetrical therewith about the vertical center plane of the shopping cart.

The end configuration or silhouette outline of the shopping cart, as described, affords a relatively clear central section and advantage is taken of this to provide a comparably shaped passageway 46 extending through the stacker unit 7 from the receiving face 47 thereof to the opposite discharge face, not shown.

The opening or passage 46 is preferably provided with a lower floor plate 48 either flush with or very nearly flush with the floor 6 so that a shopping cart can be rolled by the patron into the passageway 46, providing that passageway is not already occupied. In the normal condition of the mechanism, the passageway 46 is preferably occupied by an available shopping cart, but when a returned shopping cart 10 is wheeled into the position shown in FIGURE 1 and is still further advanced, the wheels 28 and 29 (or either of them) are effective to actuate a switch 51 on the floor 6. By suitably responsive controls the shopping cart 10 occupying the passage 46 is removed to make way for the entering or returning shopping cart 10.

This returning cart is positioned in the direction indicated by an arrow 52 on the floor 6 and is advanced manually far enough to enter almost completely into the passageway 46. The cart can only be oriented and advanced in a particular path and in a particular way since the external outline or shape of the passage 46 corresponds very closely with the external outline configuration of the cart and also because the passageway 46 is in part defined by a housing 53 resting on the floor 6 and having a silhouette configuration quite comparable to that of a portion of the interior of the cart 10.

In effect, the passageway 46 is contoured like a key slot to have a configuration just to receive the shopping cart 10 acting as a key. This relationship is established for various reasons, one of which is to afford space for various mechanism within the housing 53, but a principal one of which is to make the passageway configuration preclude the entry into the unit 7 of shopping carts of different configurations which might not operate properly in the mechanism. Perhaps most important, the special configuration precludes the entry of any portion of the patron's anatomy into the device and particularly to prevent small children from walking or crawling into the unit 7.

When the passageway 46 is free and clear of a shopping cart, having been cleared following actuation of the floor switch 51, and after the cart 10 has been advanced into position within the unit 7, the just-positioned shopping cart is raised from the floor to leave the passageway 46 clear, if desired. Under another mode of operation, when a shopping cart 10 is advanced into the passageway 46, it remains there temporarily. If a patron needs a shopping cart, the patron takes the shopping cart positioned in the pasageway 46 and withdraws that cart in the direction of the arrow 56 (FIGURE 1) and takes such cart away from the machine. Under these circumstances, the device is set to have a cart always available within the passageway 46 for withdrawal by a customer. In this event the mechanism is actuated by means presently to be described to provide another successive shopping cart within the passageway 46 promptly after the preceding cart is withdrawn. There is either made available to the patron a shopping cart for withdrawal or a space to receive the shopping cart being returned.

A shopping cart within the unit 7 and within the passageway 46 and substantially centralized therein is so positioned that its wheels rest upon a floor channel 59 (FIGURE 2) situated on the base plate 61 of the unit so that the upright frame section 18, for example, of the cart and its far cross bar 12 are substantially in an initial position as shown in FIGURE 2. The support frame 31 is so disposed as to position the hook bar 43 in a location so that the shopping cart can be lifted. It is to be understood that the showing in FIGURE 2 is only of the left half of the mechanism, the device being symmetrical about a central longitudinal plane, so that a description of one side is equally applicable to the other side.

In order to cooperate with the support frame 31, there is provided a lower elevator mechanism. This includes a lower lifting block 62 having a pair of end bosses 63 and 64 (FIGURE 4) so that the block 62 is vertically guided on upright rods 66 and 67 anchored in holders 68 on the bottom plate 61 and extending upwardly to the top of the unit (FIGURE 1) whereat they are further fastened. The lower elevator block 62 is provided with a latch lever 71 having a lower boss 72 pierced by a hinge pin 73 mounted in projections 74 on the elevator block so that the latch bar can swing outwardly of the mechanism but not inwardly because of stop flanges 70. The lower elevator block has an upstanding projection 75 appropriately tapered and positioned so that when the support frame 31 of the shopping cart is in position, or approximately, so the member 75 when the block 62 rises will enter into and will engage with the walls of the slot 42.

In order to lift the elevator block, there is provided any convenient sort of mechanism, preferably a pneumatic or hydraulic mechanism as illustrated herein. This mechanism includes a mounting framework 76 disposed on the plate 61 and by a pivot connection 77 carrying the lower end of a main elevator jack 78 or cylinder. Connections 79 and 81 extend from the cylinder to appropriate hydraulic mechanism so that the cylinder or jack 78 can be positively actuated in either direction and by hydraulic control can, if desired, be held in any location. The jack 78 is provided with a piston rod 82 carrying a driving pin 83 pivotally connected to the upper arm 84 of a link mechanism.

The arm 84 at one end has a fulcrum or pivot connection 86 to a pivot bracket 87 secured to an upright 88 included in the framework of the unit 7. The other end of the lever 84 is connected by a pivot 89 to a link 91 depending to a pivot fastening 92 on a lower arm 93 also included in the linkage mechanism. At one end the link 93 is joined by a pivot pin 94 to a bearing bracket 96 secured to a part of the part 97 of the frame of the unit 7. The free end of the lever 93 is provided with a driving pin 98 disposed in a cross slot 99 in the lower elevator block 62.

When pressure fluid is supplied to the jack 78 through the conduit 79 and when the conduit 81 serves as a drain, the piston 82 is projected from the jack and thus rotates the upper lever 84 between its solid line position in FIGURE 4 to an upper position illustrated by broken lines. In so moving, the lever 84 through the link 91 similarly lifts the lower lever 93 to swing from its lower position to an upper position. Since the link 91 is at a different distance from the respective fulcrum at its lower end than it is at the upper end, the angular sweep of the upper lever 84 is substantially less than the angular sweep of the lower lever 93. Thus the projecting movement of the piston rod 82 is multiplied. The driving pin 98 operates within the slot 99 very much in the fashion of a Scotch yoke and correspondingly lifts the lower elevator block 62. This travels from a lower position just below and out of engagement with the hook channel 38 to an upper position in which the shopping cart is lifted from its initial position on or adjacent the floor 6 to an out of the way location substantially above the opening or passage 46. As this lift starts, the projection 75 enters the key slot 42.

When the hydraulic connections to the jack 78 are reversed so that the conduit 81 acts as a source of fluid under pressure and the conduit 79 acts as a drain, then the reverse motion of the linkage takes place and a cart which is elevated above the passage 46 is lowered until it is in contact with the floor and the member 75 is out of engagement with the aperture 42.

In accordance with the invention, means are provided for restraining a shopping cart which has been lifted into a raised position. On a cross bar 101 included in the framework are mounted pawl levers 102 and 103. These have pivot mountings 104 and 106 so that the levers can swing about a horizontal axis from a retracted position out of the path of an ascending shopping cart and into a position beneath the extended hook channel 38. The pawl levers 102 and 103 are simultaneously actuated. They are both provided with lever arms 107 connected by tie rods 108 and 109 to a cross rod 110 mounted in pivot brackets 111 and 112 on the main frame, the cross bar being connected to the rods 108 and 109 by pivot pins 113. An actuating jack 114 in engagement with one of the lever arms 107 serves to rock the pawl levers 102 and 103 into and out of their engaging positions.

In the cycling of the mechanism, the lower elevator blocks 62 lift the shopping cart far enough so that the hook channel 38 is above the pawl levers 102 and 103. By suitable timing mechanism, the pawl levers which previously are out of the path of the hook channels 38 (or are brushed out of the way by the hook channels as the shopping cart rises) are then rocked inwardly under the hook channel 38. As the jack 78 is reversed and the lower elevator blocks 62 descend, the outer extremities of the channel 38 override and rest upon the then inwardly inclined pawl levers 102 and 103. The lifted shopping cart is thus held above the passageway 46. The levers 102 and 103 retain the shopping cart indefinitely or until a subsequent cycle of the elevator blocks 62.

If a subsequent cycle is for the purpose of lowering the shopping cart, the blocks 62 first rise to an elevation slightly above the upper ends of the pawl levers 102 and 103 and being between such levers engage the central portion of the hook channel 38 and slightly lift the shopping cart from the levers. When the cart has been slightly lifted, the jack 114 is actuated to swing the pawl levers 102 and 103 outwardly and out of the path of descent of the shopping cart. This is then lowered by the lower elevator blocks 62.

In accordance with the invention, there is provided mechanism effective not only to hold one shopping cart on the pawl levers 102 and 103 but also to stack a plurality of successively raised shopping carts in an elevated position. This is accomplished by each successively lifted shopping cart engaging a previously raised cart and lifting the previous carts in a stack. If a shopping cart is already in engagement with the pawl levers 102 and 103 when a subsequent cart is raised by the lower elevator blocks 62, the previously raised cart is lifted further.

This is accomplished by a pair of upper elevator blocks 121 on the opposite sides of the mechanism substantially duplicating the lower elevator blocks 62 and having guide bosses 123 in sliding engagement with the upright rods 66 and 67. The upper elevator blocks 121 also have transverse slots 124 engaged by extensions 125 of the driving pins 83 so as to afford, in effect, a Scotch yoke mechanism. The upper elevator blocks 121 are moved in consonance with the movement of the upper levers 84. The stroke or motion of the upper elevator blocks 121 is such that a shopping cart on the pawl levers 102 and 103 is lifted therefrom. During that time a subsequently raised shopping cart is disposed on the pawl levers 102 and 103. Then the upper elevator blocks 121 lower the uppermost shopping cart slightly onto the cart newly resting on the pawl levers. On a subsequent stroke, the cycle is repeated and the rising upper elevator blocks 121 lift the previously nested shopping carts through one interval to make way for an additional cart from below. A succession of such operations with shopping carts being successively fed in from below results in a stored stack of shopping carts substantially as illustrated in FIGURES 1, 2 and 3. As successive carts are fed into the machine, they are individually lifted in sequence until the machine is full. Operation of the mechanism to receive more carts is prevented by a limit switch (not shown).

When the carts are to be individually dispensed from the stacked array, the rising upper elevator blocks 121 lift the entire stack initially in a small amount and then lower the stack until the lowermost cart in the stack rests upon the then inwardly directed pawl levers 102 and 103. The upper elevator blocks 121 continue lowering themselves slightly below this position, at which time a latch lever mechanism 126 thereof is actuated. This latch lever mechanism is in general like the latch lever 71 of the lower elevator blocks 62. A latch actuating lever 127 (FIGURES 2 and 5) is appropriately positioned by a solenoid 128 mounted on a bracket 129 on the block 121 and having a restoring spring 130.

When the upper elevator block 121 is slightly below the lowermost cart then resting on the inwardly directed pawl levers 102 and 103, the projecting key 131 (corresponding to the projection 75) is below the hook channel 38 out of engagement with the walls of the aperture 42. At this time the solenoid 128 is energized to rock the member 131 outwardly out of the path of the hook channel 38. As the upper elevator block 121 rises, it by-passes engagement with the lowermost cart resting on the levers 102 and 103. The solenoid is then de-energized, the members 131 spring inwardly and interengage with the hook channel 38 of the shopping cart next above.

The lowermost elevator blocks 62 rise to lift the detached, lowermost cart from its engagement with the pawl levers 102 and 103. These are then swung out of position by the actuator 114. The following descending movement of the lower elevator blocks 62 positions the shopping cart on the floor 48 ready for withdrawal in the direction of the arrow 56 by a customer.

In normal traffic a particular unit 7 usually receives and dispenses carts in random order. It is usually preferred to have a cart always in position to be withdrawn rather than to have an empty space for receiving a used cart. For that reason, as shown in FIGURE 2, there is provided a switch 132 responsive to the weight of a shopping cart in position within the passageway. The cart weight de-energizes the switch, but as soon as the cart is removed, the switch 132 is effective to cycle the elevator jack 78 and to operate the actuator 114 and the solenoid 128 so that the emptied passageway is promptly filled with a descending replacement cart. When the replacement cart is withdrawn, the switch 132 is again actuated to cause the descent of a subsequent cart from the stack, and so on. The actuation of the floor switch 51 (FIGURE 1), however, ensures that a cart located in the passageway is lifted out of the way of the oncoming empty cart being fed in.

A cart in the passageway within the cabinet is surveyed by an electric eye mechanism (not shown) to make sure that no packages are left behind in the cart. The surveyance mechanism is effective to preclude operation of the mechanism and to afford an indicator warning should there be packages or materials remaining in the cart.

With this mechanism a plurality of vertically nestable shopping carts can be individually withdrawn from a vertically stacked upper location and can be reintroduced individually for vertical stacking, all in an automatic fashion so that a shopper can either withdraw a cart for subsequent use or can return an empty cart for storage. The mechanism can be installed in any presently existing market without substantially interfering with the building construction and can be located either as a single unit or as a battery of units in a favorable location for incoming and outgoing traffic.

In some instances, particularly where it is possible to design the mechanism into the building of the market or in other instances wherein storage below the general level of the floor is feasible, the invention is embodied particularly as shown in FIGURES 7–10 with substantially the same type of operation and mode of functioning as already described but with the vertical stacking taking place not by an above floor mechanism, but rather by a below floor device.

The down-stacking mechanism is for use in connection with a floor 201 on which a stopping cart 203 is propelled. The cart framework 204 is supported on wheels 206 and the cart is like that previously described. Included is a stacking spacer 207 on one side of the framework 204 and a similar stacking spacer 208 on the other side thereof. The framework 204 also includes longitudinally extending angle supports 209 and 211 disposed with their upper angle flanges 212 extending outwardly. The flanges 212 intermediate their ends and adjacent the spacers 207 and 208 are provided with apertures 213 provided for positioning purposes.

At appropriate locations any convenient number of lowering units 216 and 217 are situated. The units are substantially identical. A typical unit 216 is arranged in connection with an opening 218 in the floor 201 affording access to storage space below the floor. The unit 216 is in part defined by longitudinally extending parallel side walls 219 and 221 at their ends appropriately contoured to provide a key opening 222 partially defined by cutaways 223 in the end walls and partially defined by an upstanding central barrier 224. The key opening corresponds generally to the transverse cross sectional contour of the shopping cart.

Appropriately disposed within the unit 216 are substantially duplicate mechanisms arranged on the opposite sides thereof. A description of one applies equally to the other. Adjacent each of the side walls 219 and 221 there are disposed upright parallel guides 226 and 227 extending vertically to any desired depth below the level of the floor 201. On the guides 226 and 227 is disposed a vertically movable carriage 228 or elevator block having an elongated, closed slot 229 designed to receive a driving pin 231.

An actuating lever 232 carries the pin 231 and is supported pivotally by a pin 233 on a bracket 234 fixed to the general framework 236 of the unit 216. Coupled to the actuating lever 232 is the extensible piston 237 of a hydraulic jack 238 supported by a pivot 239 on a bracket 241 also mounted on the frame 236. When the jack 238 is actuated downwardly and upwardly the elevator block 228 is similarly translated along the guide rods 226 and 227.

Forming part of the block 228 (FIGURE 9) is a latch frame 242 including not only a pair of depending latch levers 243 and 244, but also including a longitudinal latch channel 246 extending for much of the length of the mechanism. The channel 246 is of a size and configuration to telescope or nest with the flange 212 of the angle 209.

Adjacent its central portion the latch channel 246 has a locating cam tongue 249 of a configuration easily to fit into the opening 213. The slope of the sides of the cam 249 is gentle enough so that as the cart 203 is advanced in the direction of the arrow 251 toward a unit 216 and with the latch mechanism in proper position, the support angles 209 and 211 are appropriately interfitted by endwise engagement with the respective channels 246, the cam tongue 249 acting as a locating key. During engagement there is a slight dropping of the forward end of the angles. The angles then ride upwardly and downwardly as they traverse the channels and until the tongue 249 is received within the centralizing opening 213. In this relationship of the parts the shopping cart is accurately located on and is positioned with respect to and is supported by the latch frames 242 and the elevator blocks 228.

When a cart has been put in this position, the mechanism is operated either manually or automatically, such as by interruption of an electric eye device (not shown) so that the jack 238 is correspondingly actuated. The lever 232 is then rotated from its full line position (FIGURE 8) toward its broken line position in that figure, during which time the elevator blocks 228 are lowered so as to lower the shopping cart as well.

The shopping cart descends vertically until such time as the first or lowermost cart comes into engagement with a receiving block 253. This is vertically reciprocable on the guide rods 226 and 227 and is disposed below the elevator block 228. The receiving block 253 is continually biased in an upward direction by a cable 254. The cable has an anchor 256 to the block 253 and extends upwardly over a pulley 257 mounted on a pulley shaft 258. The cable 254 extends to a suitable counterweight at an appropriate location (not shown) and of greater weight than the fully loaded mechanism. When the unit is completely empty, the supporting block 253 is urged upwardly by the cable 254 until the upper part of the block encounters a stop support 259.

As the shopping cart supported by the elevator block 228 lowers, it descends to a position in which side support brackets 261 are engaged by the extending flange 212. The downward urgency of the jack 238 in continuing to lower the shopping cart presses the angle flanges upon the supporting blocks 253 and thereafter lowers the cart and the supporting blocks 253 as a unit substantially into the position shown near the bottom in FIGURE 9. During this additional descent of the mechanism, the angles 209 and 211 are moved past retaining latches 263 and 264 mounted on a cross shaft 265 supported in a bracket 266 on the frame 236. The latches 263 and 264 are urged by a spring 267 into an inward location, the spring acting against a latch arm 268 on the shaft 265. The descending flange 212 rides over the upper end of the latch levers 263 and 264 and momentarily cams them laterally out of the way as the shopping cart descends. The latch levers 263 and 264 swing back into position under the urgency of the spring 267 and thus retain the shopping cart in a lower position against the upward urgency of the cable 254.

When this interrelationship has been established, the latch mechanism 242 is appropriately actuated. Connected to the latch 242 is the core 271 of a solenoid actuator 272 mounted on the elevator block 228 and connected by a pivot link 273 to the latch 242. When the shopping cart is engaged by the latch lever 263 and is held in a lower position despite the upward urgency of the cable 254, the jack 238 continues its downward motion slightly so that the tongue 249 is lowered out of or below the opening 213. The solenoid 272 is then immediately actuated and the core 271 in moving into the solenoid retracts the latch mechanism 242 out of the line of advance of the shopping cart. The connections to the jack 238 are then reversed, the solenoid 272 still being energized and the latch 242 still being retracted. The jack 238 and its associated machinery, being completely free of the lowered shopping cart, return to their original uppermost position available for the reception of a successive shopping cart. During the return movement, the solenoid 272 is de-energized, and a spring 274 therein restores the core mechanism and the latch 242 to the inwardly projected location for reception of a subsequent cart to be lowered.

This cycle is repeated as many times as shopping carts are fed into the structure 216 for lowering and until the device is full. Each shopping cart as it descends telescopes by means of the spacers 207 and 208 with the shopping cart immediately below it and lowers until the latch 263 engages with it. The supporting brackets 261 descend in increments equal in number to the capacity of the structure. The cycle can be repeated until the device is full and the cable 254 has been extended to its maximum amount.

A reverse operation takes place when carts are withdrawn from the full or partially full device. When a cart is removed from the unit 216 by being drawn in the direction of the arrow 251 onto the floor, the longitudinal translation of the angle supports 209 and 211 disengages them from the channels 246 with the flanges 212 riding or camming over the tongues 249. When the uppermost cart has been withdrawn, the jack 238 is energized and the elevator blocks 228 lower with the latch channels 246 in their projected positions and descend to a location substantially as shown in FIGURE 10. The spring 274 yields momentarily as the latches 246 cam over the flanges 212. This is accomplished with the elevator block 228 stopping slightly lower than the location at which the cart is retained by the latch 263.

The jack 238 is then reversed in its direction of operation so that the latch mechanism 246 lifts and the tongue 249 rises into interengagement with the boundaries of the opening 213. Also, the latch 263 is momentarily retracted by energization of the propelling solenoid 281 so that restraint over the uppermost shopping cart in the stack on the supporting bracket 261 is released. Thus, as the jack 238 retracts the piston 237 and lifts the elevator block 228 with the uppermost shopping cart in engagement therewith, the counterbalancing cable 254 also lifts the previously stored stack of shopping carts. The stack is lifted through the height of one unit, at which time the next successive cart is arrested by engagement of its flange 212 with the then re-extended latch 263 since the solenoid 281 has been de-energized just after the release of the previous cart. The released cart on the elevator block 228 is then lifted to floor level whereupon the jack 238 is de-energized. The raised shopping cart can then be withdrawn longitudinally as before.

This mechanism provides for the successive stacking of a series of individual shopping carts in a vertical array in a space below the floor level, receiving shopping carts when they are to be stored and releasing shopping carts to the floor level when they are to be furnished for use.

What is claimed is:

1. A shopping cart stacker for use with a shopping cart having a clear central section along the bottom thereof comprising a base, a frame on said base, a barrier upstanding from said base and adapted to be closely received in said central section, latch means on said frame for supporting a group of vertically nested shopping carts at a predetermined elevation on said frame, an upper elevator reciprocable on said frame for lifting said group from and depositing said group on said latch means, a lower elevator reciprocable on said frame beyond said barrier for lifting a single cart from said base to said predetermined elevation for engagement with said latch means and for lowering a single cart from said latch means to said base, and means on said frame for operating said upper elevator and said lower elevator in unison.

2. A device as in claim 1 in which said latch means operates in timed relation with the operation of said elevators.

3. A shopping cart stacker for use with a shopping cart having a clear central section along the bottom thereof comprising a base, a frame on said base, a barrier upstanding from said base and adapted to be closely received in said central section, latch means on said frame for supporting a group of vertically nested shopping carts at a predetermined elevation on said frame, an upper elevator reciprocable on said frame for lifting said group from and depositing said group on said latch means, a lower elevator disposed beyond said barrier and reciprocable on said frame for lifting a single cart from said base to said predetermined elevation for engagement with said latch means and for lowering a single cart from said latch means to said base, linkage on said frame interconnecting said upper elevator and said lower elevator for movement in unison, and means for moving said latch means into and out of position for supporting engagement with a group of said carts in unison with said movement of said elevators.

4. A shopping cart stacker for use with a shopping cart having a clear central section along the bottom thereof comprising a base, a frame upstanding from said base, a barrier upstanding from said base and adapted to be closely received in said central section, latch means at a predetermined elevation on said frame, means for moving said latch means in a predetermined transverse path on said frame, an upper elevator on said frame for lifting and lowering a shopping cart in an upper vertical path intersecting said transverse path, a lower elevator on said frame beyond said barrier for lifting and lowering a shopping cart in a lower vertical path intersecting said transverse path, and means for operating said upper and lower elevators and said latch means in timed relationship.

5. A shopping cart stacker for use with a shopping cart having a clear central section along the bottom thereof comprising a base; a frame upstanding from said base; a barrier upstanding from said base and adapted to be closely received in said central section; latch means on said frame; means for moving said latch means in a predetermined transverse path on said frame; an upper elevator on said frame; means for moving said upper elevator in a vertical path intersecting said transverse path; means on said upper elevator movable into and out of a position to engage a shopping cart; a lower elevator disposed beyond said barrier on said frame; means for moving said lower elevator in a vertical path intersecting said transverse path; and means for operating said latch means, said upper elevator, said lower elevator and said movable means in timed relationship.

6. A shopping cart stacker for use with a shopping cart having an indexing member thereon and having a clear central section along the bottom thereof comprising a base, a frame on said base, a barrier upstanding from said base and adapted to be closely received in said central section, means on said frame beyond said barrier movable into and out of engagement with said indexing member for lifting and lowering said shopping cart, means on said frame for latching said shopping cart in a position away from said base, and means for operating said latching means and said lifting and lowering means in synchronism.

7. A shopping cart stacker for use with a shopping cart having an indexing member thereon and having a clear central section along the bottom thereof comprising a base, a frame upstanding from said base, a barrier upstanding from said base and adapted to be closely received in said central section, an elevator mounted beyond said barrier to move up and down said frame, means on said elevator movable into and out of position for interengagement with said indexing member, means for moving said interengagement means into and out of said position, means for moving said elevator, and means for operating said elevator moving means and said interengagement means in timed relationship.

8. A shopping cart stacker for use with a shopping cart having an indexing member and having a latch member and having a predetermined reentrant contour in transverse cross section comprising a base; a frame extending from said base; a barrier upstanding from said base and adapted to fit closely in said contour; an elevator reciprocable on said frame in a predetermined vertical path beyond said barrier; means on said elevator movable into and out of position for interengagement with said indexing member; means for moving said interengagement means into and out of position; latch means on said frame movable into and out of position to engage said latch member; means for reciprocating said elevator on said frame; and means for operating said reciprocating means, said interengagement means and said latch means in timed relationship.

9. A shopping cart stacker for use with a shopping cart having a predetermined contour in transverse cross section including a reentrant portion extending upwardly from the bottom of the cart comprising a base over which said cart is advanced in a horizontal path, a frame upstanding from said base in said path, said frame in transverse cross section having an upstanding barrier substantially complementary and adapted to be closely received in said reentrant portion, means on said frame beyond said barrier for moving said shopping cart out of said path, and means actuated by said shopping cart in said path ahead of said barrier for operating said moving means.

10. A shopping cart stacker for use with a shopping cart having along each side a hook channel with a slot therein, said shopping cart throughout its length having a transverse cross sectional contour with an upwardly extending reentrant portion between said sides comprising a horizontal base on which said shopping cart is adapted to be longitudinally advanced, means upstanding on said base and having a contour to lie closely adjacent said sides and including an upstanding transverse barrier adapted to be closely received in said reentrant portion, a frame on said base and extending perpendicular thereto, means on said frame in position to interengage said hook channel and said slot after said shopping cart has advanced on said base beyond said upstanding means, and means on said frame for vertically moving said shopping cart in interengagement with said hook channel and said slot.

References Cited in the file of this patent

UNITED STATES PATENTS

| | | |
|---|---|---|
| 2,251,197 | Nestmann | July 29, 1941 |
| 2,634,001 | Griffin | Apr. 7, 1953 |
| 2,769,570 | Adams | Nov. 6, 1956 |
| 2,931,524 | Hallenius | Apr. 5, 1960 |
| 2,993,315 | Verrinder | July 25, 1961 |
| 3,053,402 | Russell | Sept. 11, 1962 |

FOREIGN PATENTS

| | | |
|---|---|---|
| 823,148 | Great Britain | Nov. 4, 1959 |